United States Patent
West et al.

(10) Patent No.: US 12,136,760 B2
(45) Date of Patent: Nov. 5, 2024

(54) VHF FOLDED STRUCTURALLY INTEGRATED ANTENNA FOR VERTICAL LIFT AIRCRAFT

(71) Applicant: Rockwell Collins, Inc., Cedar Rapids, IA (US)

(72) Inventors: James B. West, Cedar Rapids, IA (US); Shahbaz M. Chaudhry, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 79 days.

(21) Appl. No.: 17/739,791

(22) Filed: May 9, 2022

(65) Prior Publication Data
US 2023/0361454 A1  Nov. 9, 2023

(51) Int. Cl.
*H01Q 1/28* (2006.01)
*B64C 1/36* (2006.01)
*H01Q 5/25* (2015.01)
*H01Q 13/16* (2006.01)
*H01Q 21/24* (2006.01)

(52) U.S. Cl.
CPC .............. *H01Q 1/287* (2013.01); *B64C 1/36* (2013.01); *H01Q 5/25* (2015.01); *H01Q 13/16* (2013.01); *H01Q 21/24* (2013.01)

(58) Field of Classification Search
CPC .......... H01Q 1/28; H01Q 1/281; H01Q 1/286; H01Q 1/287; H01Q 5/25; H01Q 13/085; H01Q 13/10; H01Q 13/106; H01Q 13/16; H01Q 21/24; B64C 1/36
See application file for complete search history.

(56) References Cited

U.S. PATENT DOCUMENTS

| 2,589,664 A | 3/1952 | Bowman |
| 2,612,606 A | 9/1952 | Stephen |

(Continued)

FOREIGN PATENT DOCUMENTS

| CN | 110085975 B | | 2/2020 |
| CN | 114243263 A | * | 3/2022 |
| FR | 2175756 A1 | | 2/2022 |

OTHER PUBLICATIONS

Extended European Search Report dated Oct. 11, 2023; European Application No. 23171905.5.

(Continued)

*Primary Examiner* — Dameon E Levi
*Assistant Examiner* — Leah Rosenberg
(74) *Attorney, Agent, or Firm* — Suiter Swantz IP

(57) ABSTRACT

A folded slot structurally integrated antenna is defined within the structure of the vertical stabilizer. The folded slot structurally integrated antenna comprises a first terminal with a flared portion, a substantially constant slot width potion, and a second terminal with a flared portion. The substantially constant slot width potion may include one or more curvatures to extend the length of the folded slot structurally integrated antenna within the vertical stabilizer. The antenna system may utilize reactive loading or dynamic slot length switching. A platform may include folded slot structurally integrated antennas in both a vertical stabilizer and horizontal wings or winglets. Horizontal and vertical folded slot structurally integrated antennas may be utilized to produce various polarization profiles.

19 Claims, 7 Drawing Sheets

(56) References Cited

U.S. PATENT DOCUMENTS

| | | | |
|---|---|---|---|
| 3,623,162 A | 11/1971 | Whitty | |
| 4,509,053 A | 4/1985 | Robin et al. | |
| 4,843,403 A * | 6/1989 | Lalezari | H01Q 13/106 343/700 MS |
| 4,916,457 A * | 4/1990 | Foy | H01Q 13/106 343/768 |
| 6,864,848 B2 * | 3/2005 | Sievenpiper | H01Q 9/14 343/768 |
| 7,167,136 B2 | 1/2007 | Thudor et al. | |
| 9,019,143 B2 | 4/2015 | Obermeyer | |
| 9,270,016 B2 | 2/2016 | Stoneback et al. | |
| 10,644,385 B1 | 5/2020 | Greenwood et al. | |
| 11,095,036 B1 | 8/2021 | Lambert | |
| 11,258,167 B1 | 2/2022 | Graf et al. | |
| 2010/0207829 A1 * | 8/2010 | Parsche | H01Q 13/18 343/731 |
| 2017/0301987 A1 * | 10/2017 | Mack | H01Q 1/1257 |

OTHER PUBLICATIONS

Koo, Yun Seo, "Wide Band Embedded Slot Antennas for Biomedical, Harsh Environment, and Rescue Applications." PhD diss., University of Tennessee, 2015. https://trace.tennessee.edu/utk_graddiss/3379.

* cited by examiner

VHF FOLDED STRUCTURALLY INTEGRATED ANTENNA FOR VERTICAL LIFT AIRCRAFT

BACKGROUND

Modern airborne platforms, including vertical lift platforms, include numerous antennas designed for various critical systems. State-of-the-industry federated communication systems that cover the VHF to Ku bands are heavy and the high antenna count creates prohibitively high aerodynamic drag for high-speed attack helicopter operations. Those antennas introduce drag; furthermore, for certain operational ranges, antennas are necessarily too large to fit externally. Ultra-Wide Band (UWB) and band-segmented structurally integrated antennas are important for conformal, low aerodynamic drag integrated communication systems to enable greater range, speed, agility, and payload capacity. Existing antennas are not low radar cross-section.

Lower antenna count and reduced radar cross-section are generally desirable, especially for military applications. Existing manned and unmanned vertical lift platforms do not satisfy the need for a low antenna count, reduced drag, and reduced radar cross-section.

SUMMARY

In one aspect, embodiments of the inventive concepts disclosed herein are directed to a folded slot structurally integrated antenna defined within the structure of the vertical stabilizer. The folded slot structurally integrated antenna comprises a first terminal with a flared portion, a substantially constant slot width potion, and a second terminal with a flared portion. The substantially constant slot width potion may include one or more curvatures or meanders to extend the length of the folded slot structurally integrated antenna within the vertical stabilizer.

In a further aspect, the antenna system may utilize reactive loading or dynamic slot length switching.

In a further aspect, a platform may include folded slot structurally integrated antennas in both a vertical stabilizer and horizontal wings or winglets. Horizontal and vertical folded slot structurally integrated antennas may be utilized to produce various polarization profiles.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
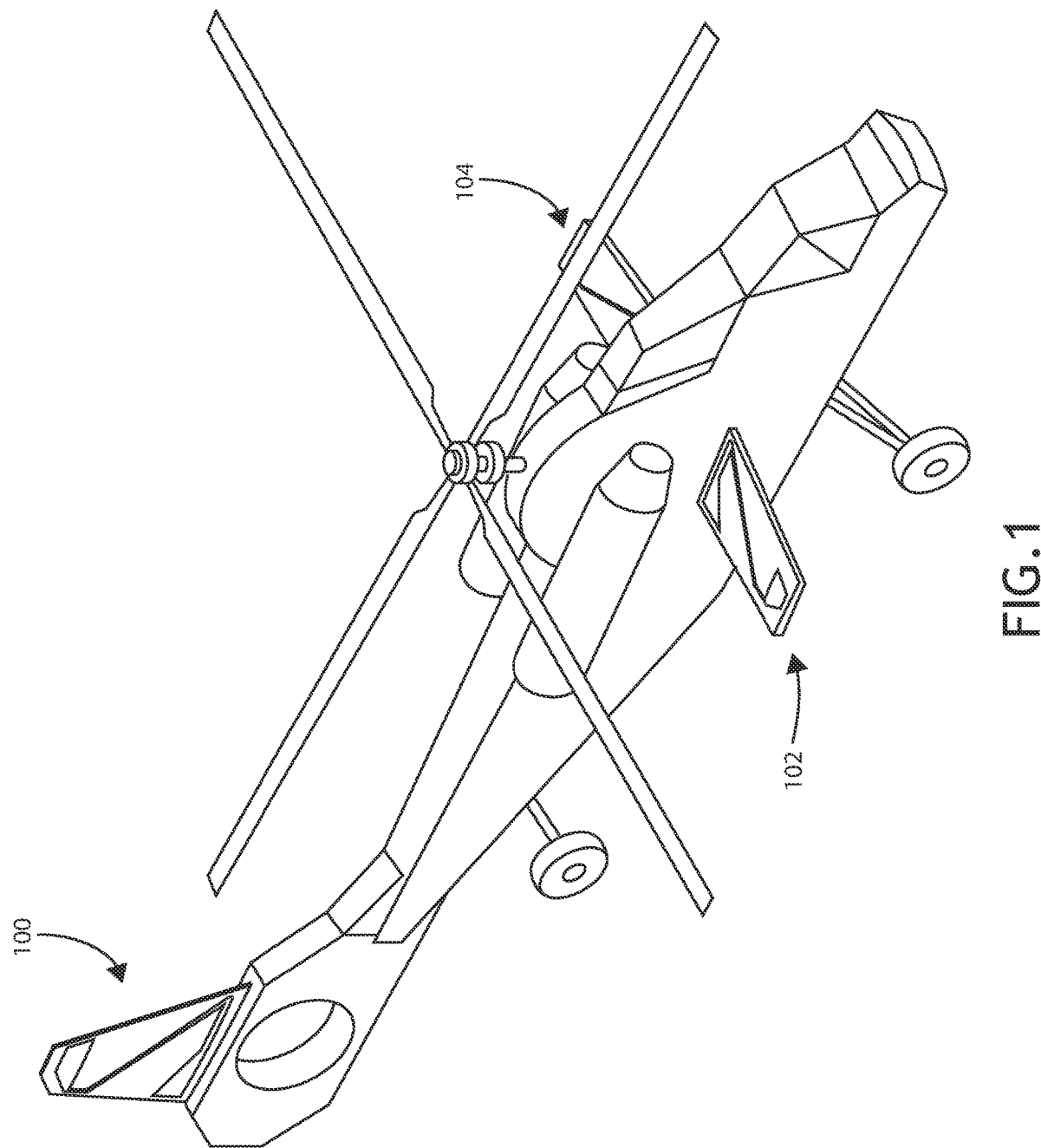
FIG. 1 shows an environmental view of a vertical lift platform including an exemplary embodiment of a folded slot antenna.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a folded slot structurally integrated antenna defined within the structure of the vertical stabilizer. The folded slot structurally integrated antenna comprises a first terminal with a flared portion, a substantially constant slot width potion, and a second terminal with a flared portion. The substantially constant slot width potion may include one or more curvatures or meanders to extend the length of the folded slot structurally integrated antenna within the vertical stabilizer.

Referring to FIG. 1, an environmental view of a vertical lift platform including an exemplary embodiment of a folded slot antenna is shown. The vertical lift platform (for example a manned or unmanned helicopter) may include a vertical stabilizer 100 that defines a folded slot antenna. The folded slot antenna is an opening defined by the conductive, metallic structure of the vertical stabilizer 100. The vertical stabilizer 100 may include a nonconductive filler material or nonconductive internal structure to provide support. Furthermore, the vertical stabilizer 100 may be covered by a nonconductive skin to maintain the aerodynamic characteristics of the vertical stabilizer 100. In at least one embodiment, a vertical stabilizer utilizes a combination of space filling, bending, and flexible aperture loading.

The vertical lift platform may also include one or more winglets 102, 104. In at least one embodiment, the winglets 102, 104 also define folded slot antennas. Likewise, the folded slot antennas of the winglets 102, 104 may include a nonconductive filler material or nonconductive internal structure and a nonconductive skin to maintain the aerodynamic characteristics of the corresponding winglets 102, 104.

In at least one embodiment, the vertical lift platform includes a communication or avionics system configured to excite radiation patterns in the vertical stabilizer 100 and winglets 102, 104. Each of the vertical stabilizer 100 and winglets 102, 104 may be configured via electronic signals to produce radiation patterns having vertical or horizontal polarization. Dynamically controlling the signals at the vertical stabilizer 100 and the winglets 102, 104, with electronic circuitry at the corresponding feed locations to maintain phase relationship between the antennas over the operating frequency range and different angles, may enable production of circular or elliptical polarization.

Figure 2A:
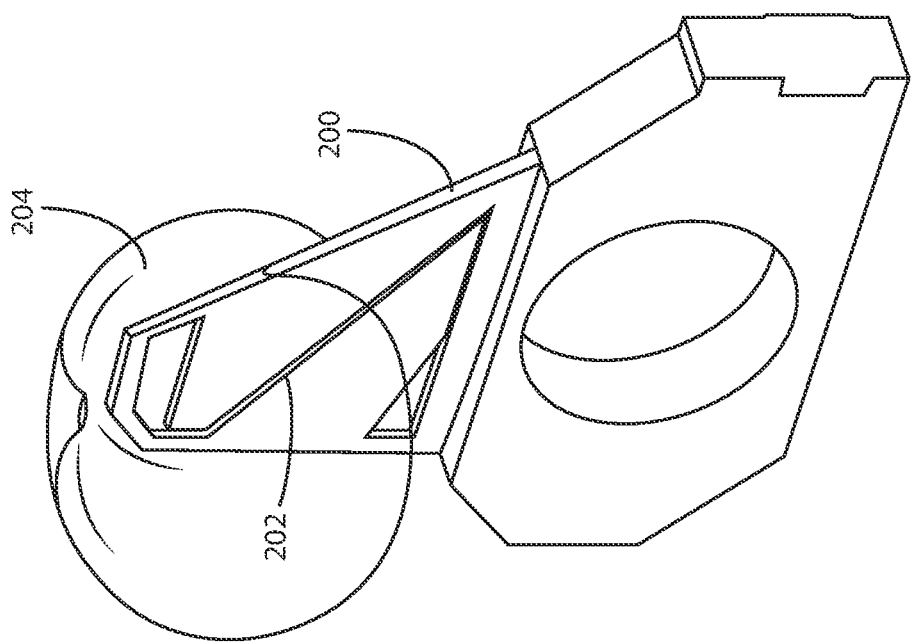
FIG. 2A shows a perspective view of a folded slot antenna according to an exemplary embodiment.
Figure 2B:
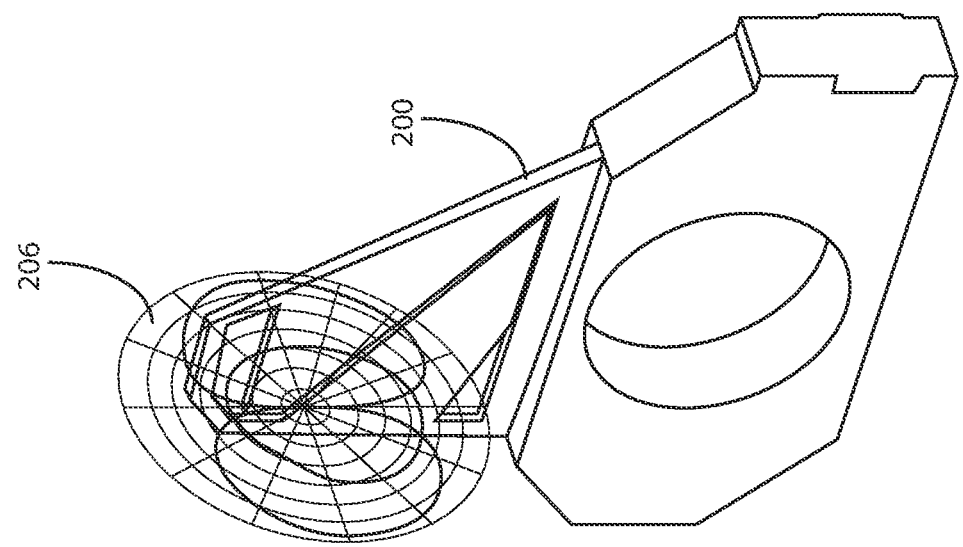
FIG. 2B shows a perspective view of a folded slot antenna according to an exemplary embodiment.
Figure 2C:
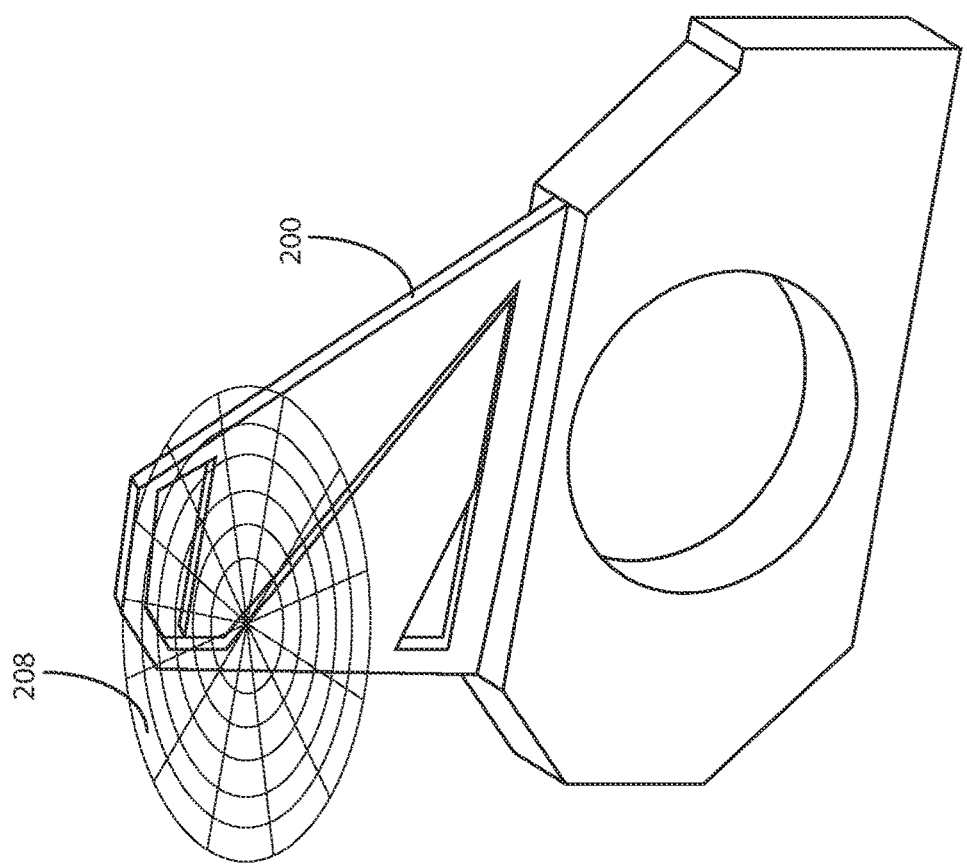
FIG. 2C shows a perspective view of a folded slot antenna according to an exemplary embodiment.

Referring to FIGS. 2A-2C, perspective views of a folded slot antenna 202 according to an exemplary embodiment are shown. A vertical stabilizer 200 that defines the folded slot antenna 202 may produce a vertically polarized gain pattern 204, an elevation pattern 206, and an azimuth pattern 208. The folded slot antenna 202 may include adjustable feed locations, or a feed element disposable at various locations, tailored to specific aerostructure configurations. Furthermore, the folded slot antenna 202 may be configured for reactive loading and/or dynamic slot length switching via electronically selectable shorting elements.

In at least one embodiment, folded slot antennas 202 may be operated to produce a certain signal polarization. Where the platform also includes winglets that define horizontal folded slot antennas (as illustrated by the winglets 102, 104 in FIG. 1), the folded slot antenna 202 of the vertical stabilizer 200 and the folded slot antennas of the winglets may be operated in concert, with the aid of electronic circuitry at the feed elements to maintain phase relationship between the two antennas, to produce a circularly or elliptically polarized radiation pattern.

Figure 3:
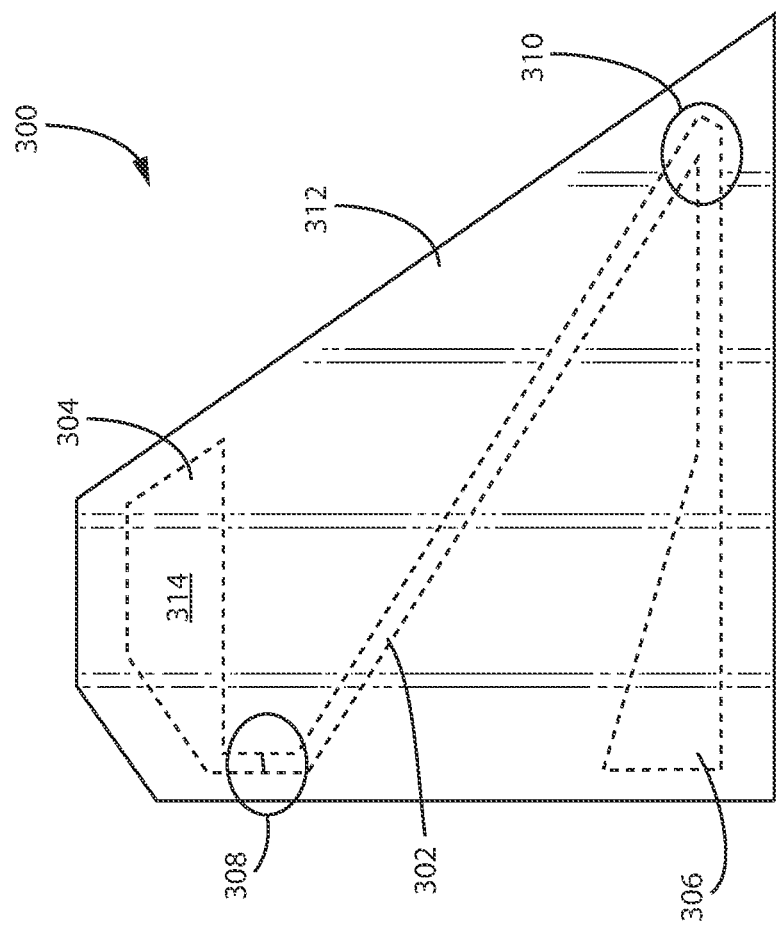
FIG. 3 shows a side view of a folded slot antenna according to an exemplary embodiment.

Referring to FIG. 3, a side view of a folded slot antenna according to an exemplary embodiment is shown. A vertical stabilizer 300 defines a folded slot antenna comprising a substantially constant width portion 302, a first terminal 304 with a flared portion, and a second terminal 306 having a flared portion 306. A feeder element 308 may be disposed internally to supply signals to opposite ends of the folded slot antenna. For aerodynamic purposes, the vertical stabilizer 300 may be covered by nonconductive, electromagnetically benign skin 312; for example, a plastic skin. Alternatively, the vertical stabilizer 300 may be comprised of a stratified medium, with only the conductive or partially conductive layers having opening to create folded slot, or in addition, the vertical stabilizer 300 may include a dielectric filler material 314; for example, through injection molding, blowing, etc. In at least one embodiment, the vertical stabilizer 300 may include nonconductive structural elements; for example, internal struts.

The substantially constant width portion 302 comprises a major rectangular slot. In order to increase the length of the substantially constant width portion 302, curves 310, 312 redirect the substantially constant width portion 302. The curves 310, 312 allow the antenna to look electrically bigger than otherwise possible. A middle portion of the substantially constant width portion 302 may be meandered to further increase slot electrical length. The antenna is broadband or ultra-wideband because it is electrically large. It may be appreciated that embodiments of the present disclosure may be useful for operations in the VHF to L-band, or above.

The first terminal 304 and second terminal 306 comprise loading features of the folded slot antenna disposed at the top and bottom legs of the rectangular slot. The size and shape of the terminals may be dynamically configured via electronically addressable shorting elements. A traditional, narrow half-wave slot antenna bent around to fill a space would have significant cross polarization; embodiments of the present disclosure produce a superior polarization profile.

Figure 4:
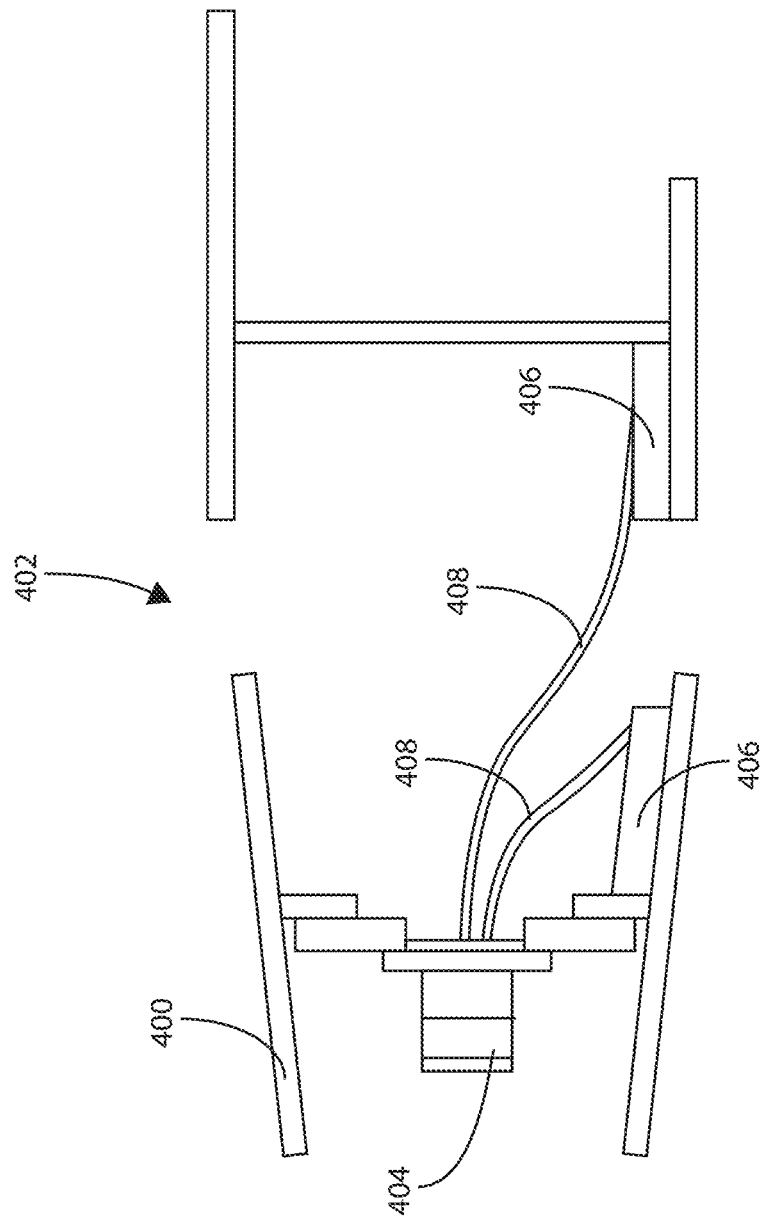
FIG. 4 shows a top partial view of a folded slot antenna according to an exemplary embodiment.

Referring to FIG. 4, a top partial view of a folded slot antenna according to an exemplary embodiment is shown. Where an airborne platform includes a folded slot antenna 402 defined by panels 400 of the airborne platform, a feed element 408 provides an access interface 404 to apply signals to separate surfaces of the folded slot antenna 402 via a connection element 406. In at least one embodiment, multiple feed elements 408 may be disposed at various locations along the folded slot antenna 402. The multiple feed elements 408 may be switched electronically to operate the folded slot antenna 402 at different frequencies or with different bandwidths.

Figure 5:
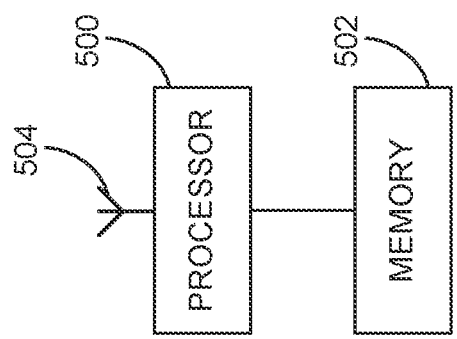
FIG. 5 shows a block diagram of a system suitable for implementing embodiments of the present disclosure.

Alternatively, or in addition, electronically addressable shorting elements may be disposed at locations along the folded slot antenna 402. The shorting elements short out terminal portions of the folded slot antenna. The remaining, rectangular portion (which may include a curved portion continuously connecting elements of the rectangular portion) would be physically shorter, having a higher frequency natural resonance. Shorting elements effectively shorten the slot length to vary the operating frequency or bandwidth. Referring to FIG. 5, a processor 500 may be configured via processor executable code stored in a memory 502 to apply signals to each feed element in a folded slot antenna 504 to produce radiation patterns. In at least one embodiment, the processor 500 is configured to apply a first signal to a folded slot antenna 504 in a vertical stabilizer to produce a first polarization and a second signal to a folded slot antenna 504 in a winglet to produce a second polarization.

In at least one embodiment, adjustable feed locations allow the folded slot antenna 402 to be tailored to specific aerostructure configurations. A folded slot antenna 402 offers attractive terminal impedance across the VHF band. Embodiments may allow adjustable or flexible feed and reactive loading and/or dynamic slot length switching.

Embodiments of the present disclosure utilize the surface area of vertical stabilizers and winglets to make the antenna as electrically large as possible without compromising the aerodynamics of the platform. A folded slot structurally integrated antenna within the vertical airframe structure to provide provides a much larger electrical length that traditional "shark fin" antennas to improve both realized antenna gain and ultra-wide band self-impedance match. Folding techniques illustrated herein increase the slot antenna's electrical size while retaining antenna polarization purity, particularly linear polarization purity. Orientation of the folded slot antenna may be adjusted to maximize vertical polarization content and minimize cross polarization within an "omni-like" radiation pattern.

Embodiments of the present disclosure provide passive reactive loading of the slot antenna to extend its operational bandwidth to lower frequencies. Likewise, electronically switchable passive reactive loading of the slot antenna extends its operational bandwidth to lower frequencies; electronically controlled/switched reactive elements create an FSS-like structures to lower in-band RCS performance when the antenna in not being utilized. A modular input section to the antenna that is compatible with an active RF front end Tx/Rx amplifier/transceiver allows integration to improve communication system performance by removing long, lossy RF cable runs.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A slot antenna comprising:
    a flared first terminal portion;
    a flared second terminal portion;
    a substantially constant width rectangular portion; and
    at least two electronically addressable feed elements, each connected to opposing surfaces of the substantially constant rectangular portion, disposed at various locations of the substantially constant rectangular portion to operate the slot antenna at different frequencies,
    wherein:
        the flared first terminal, flared second terminal, and substantially constant width rectangular portion are each defined by at least one panel of an airborne platform; and
        the substantially constant width rectangular portion comprises at least one curve such that the substantially constant width rectangular portion is electronically larger than would otherwise fit in the at least one panel of the airborne platform.

2. The slot antenna of claim 1, further comprising a nonconductive skin disposed over the at least one panel.

3. The slot antenna of claim 1, wherein the at least one panel comprises a vertical stabilizer.

4. The slot antenna of claim 3, further comprising a non-conductive filler material disposed within the vertical stabilizer.

5. The slot antenna of claim 3, wherein the vertical stabilizer comprises a dielectric material.

6. A communication system comprising:
    at least one panel defining a slotted antenna comprising:
        a flared first terminal portion;
        a flared second terminal portion;
        a substantially constant width rectangular portion comprising three portions, continuously connected by two curves such that the substantially constant width rectangular portion is electronically larger than would otherwise fit in the at least one panel; and
        at least two electronically addressable feed elements, each connected to opposing surfaces of the substantially constant rectangular portion, disposed at various locations of the substantially constant rectangular portion to operate the slotted antenna at different frequencies; and
    at least one processor in data communication with each feed element, the at least one processor configured to apply signals to each feed element to produce radiation patterns via a corresponding slotted antenna.

7. The airborne platform of claim 6, further comprising a nonconductive skin disposed over the at least one panel.

8. The airborne platform of claim 6, wherein the at least one panel comprises a vertical stabilizer.

9. The airborne platform of claim 8, further comprising a non-conductive filler material disposed within the vertical stabilizer.

10. The airborne platform of claim 8, wherein the vertical stabilizer comprises a dielectric material.

11. The airborne platform of claim 8, wherein the at least one panel further comprises one or more winglets.

12. The airborne platform of claim 11, wherein the at least one processor is configured to apply a first signal to the slotted antenna in the vertical stabilizer to produce a first polarization and a second signal to the slotted antenna in the at least one winglet to produce a second polarization.

13. An airborne platform comprising:
    at least one panel defining a slotted antenna comprising:
        a flared first terminal portion;
        a flared second terminal portion;
        a substantially constant width rectangular portion comprising a first portion and a second portion continuously connected by a curve such that the substantially constant width rectangular portion is electronically larger than would otherwise fit in the at least one panel; and
        at least two electronically addressable feed elements, each connected to opposing surfaces of the substantially constant rectangular portion, disposed at various locations of the substantially constant rectangular portion to operate the slotted antenna at different frequencies; and
    at least one processor in data communication with each feed element, the at least one processor configured to apply signals to each feed element to produce radiation patterns via a corresponding slotted antenna.

14. The airborne platform of claim 13, further comprising a nonconductive skin disposed over the at least one panel.

15. The airborne platform of claim 13, wherein the at least one panel comprises a vertical stabilizer.

16. The airborne platform of claim 15, further comprising a non-conductive filler material disposed within the vertical stabilizer.

17. The airborne platform of claim 15, wherein the vertical stabilizer comprises a dielectric material.

18. The airborne platform of claim 15, wherein the at least one panel further comprises one or more winglets.

19. The airborne platform of claim 18, wherein the at least one processor is configured to apply a first signal to the slotted antenna in the vertical stabilizer to produce a first polarization and a second signal to the slotted antenna in the at least one winglet to produce a second polarization.

\* \* \* \* \*